United States Patent [19]
Devletian

[11] Patent Number: 4,672,164
[45] Date of Patent: Jun. 9, 1987

[54] COMPOSITE METAL MATRIX WELDING

[75] Inventor: Jack H. Devletian, Portland, Oreg.

[73] Assignee: Oregon Graduate Center, Beaverton, Oreg.

[21] Appl. No.: 807,535

[22] Filed: Dec. 11, 1985

[51] Int. Cl.⁴ ............................................. B23K 11/00
[52] U.S. Cl. ................................. 219/96; 219/137 R; 219/99; 219/117.1
[58] Field of Search ................. 219/137 R, 95, 96, 98, 219/99, 113, 117.1, 118

[56] References Cited

U.S. PATENT DOCUMENTS 3,415,974 12/1968 Graham .................................. 219/95
3,767,887 10/1973 Harder .................................... 219/98

OTHER PUBLICATIONS

*Welding Handbook* 7th ed. vol. 2 "Welding Processes—Arc and Gas Welding and Cutting, Brazing, and Soldering" pp. 262–275 & 282–294.
Kennedy, James R. "Fusion Welding of Titanium-Tungsten and Titanium-Graphite Composites," *Welding Journal,* May 1972, pp. 250-s–259-s.
Goddard, D. M. et al. "Feasibility of Brazing and Welding Aluminum-Graphite Composites," *Welding Journal,* Apr. 1972, pp. 178s–182s.
Gunn, Charles, "Thin-Metals Percussive Welded Without Marring or Distortion", *Welding Engineer,* Apr. 1961, pp. 48–49.
Ahern, et al., *Fusion Welding of SiC-Reinforced Al Composites,* Metal Construction, Apr. 1982, pp. 192–197.
DOD Metal Matrix Composites Information Analysis Center (MMCIAC) No. 00461, *Discontinuous Silicon Carbide Reinforced Aluminum Metal Matrix Composites Data Review,* Dec. 1984, pp. 10-1–10-54.

*Primary Examiner*—E. A. Goldberg
*Assistant Examiner*—C. M. Sigda
*Attorney, Agent, or Firm*—Kolisch, Hartwell & Dickinson

[57] ABSTRACT

A method for joining individual pieces of material together includes the steps of heating the pieces to be welded together, at least one of which consists of a metal matrix with a relatively low melting point and a reinforcement material distributed therein, the reinforcement having a relatively high melting point. The other piece may be a similar metal matrix composite, or may be a metal or alloy which is to be joined to the first piece. The pieces are heated to a temperature which is above the melting points of the metals and below the melting point of the reinforcement. The pieces so heated are brought into contact with one another and then cooled to a temperature below the melting points of the metals. One technique for practicing the method of the invention is that of capacitor discharge welding.

24 Claims, 10 Drawing Figures

COMPOSITE METAL MATRIX WELDING

BACKGROUND OF THE INVENTION

The instant invention relates to a method of fusion welding material, and specifically, relates to a method of fusion welding what are known as metal matrix composites.

A composite may be defined as a man-made material in which two or more constituents are combined to create a material having properties different than those of either constituent. One form of metal matrix composites (MMC) includes those materials which consist of a metal matrix, such as aluminum (Al), cobalt (Co), Iron (Fe) or Magnesium (Mg) or alloys of these metals and a reinforcement material, such as silicon carbide (SiC), tungston carbide (WC), graphite (C) or boron carbide ($B_4C$) distributed in the matrix. The reinforcement may be in the form of fibers, wires, whiskers, flakes or particulates.

Composites, such as SiC/Al, $B_4C$/Al or $B_4C$/Mg are stronger and lighter than their constituents and are particularly abrasion resistant. Secondary processing of metal matrix composites is, however, difficult in that the composites are not easily welded or machined. $B_4C$ has a hardness, for example, close to that of diamonds, and a composite of $B_4C$ in a matrix of Mg alloy results in a material which is very difficult to machine.

Conventional fusion welding of MMCs results in extremely porous welds, having little structural strength. (Ahern, et al., *Fusion Welding of SiC-Reinforced Al Composites*, Metal Construction, Apr. 1982, pp. 192-197.) The matrix or reinforcement materials apparently evolve absorbed gases at normal welding temperatures resulting in gas pockets throughout the weld. One method suggested by Ahern is to bake the composite at temperatures near the matrix melting point to degas the composite.

Rapid solidification methods of welding, such as laser or electron beam welding, produce unsatisfactory results in that the normal matrix and the reinforcement therein are heated to the melting point of the reinforcement, with the results that the metal vaporizes, thereby destroying the composite. The reinforcements generally have melting points of approximately 2500° centigrade while the metal constituents generally have a melting point of 600°-1500° centigrade.

Additionally, if the metal matrix and the reinforcement material reach a high temperature, or if they are maintained for a sufficient length of time at an elevated temperature, which may even be a temperature below the melting point of the matrix, a chemical reaction between the metal and the reinforcement material may occur. In the case of SiC/Al, an aluminum carbide compound may form which destroys the originally intended properties of the composite which is at its strongest when discrete particles, fibers, etc., of SiC are distributed in the aluminum matrix.

Composites may be braze welded but the weld is, of course, no stronger than the filler metal, such as 4043 Al, used in the weld. Filler metal, such as 4043 Al, has less strength than 6061 Al and, because the weld time is fairly long, the previously noted chemical reaction may occur between the matrix and the reinforcement material. Such a procedure may also be of sufficient duration that the matrix or the reinforcement material in the base composite may begin to evolve trapped gases, expanding the base composite, thereby weakening the final structure.

An object of the instant invention is to provide a method of welding metal matrix composite materials which will produce a weld having a strength at least as great as that of the base material.

Another object of the instant invention is to provide a method of welding a metal matrix composite to produce a nonpourous weld.

A further object of the instant invention is to provide a method of welding a metal matrix composite which does not melt the reinforcement constituent thereof.

Another object of the instant invention is to provide a method of welding a metal matrix composite which does not cause a significant chemical reaction between the matrix and the reinforcement material distributed therein.

Still another object of the instant invention is to provide a method of welding a metal to a metal matrix composite.

SUMMARY OF THE INVENTION

The method of the instant invention includes the steps of heating the pieces to be welded together, at least one of which is a metal matrix composite which consists of a metal matrix with a relatively low melting point and a reinforcement material distributed therein, the reinforcement having a relatively high melting point. The other piece may be a similar metal matrix composite, or may be a metal or alloy which is to be joined to the first piece. The pieces are heated to a temperature which is above the melting points of the metals and below the melting point of the reinforcement. The pieces so heated are brought into contact with one another and then cooled to a temperature below the melting points of the metals. One technique for practicing the method of the invention is that of capacitor discharge welding.

These and other objects and advantages of the invention will become more fully apparent as the description which follows is read in conjunction with the drawings.

DETAILED DESCRIPTION OF THE PREFERRED EMBODIMENT

As previously noted, a metal matrix composite (MMC) consists of a metallic matrix having a reinforcement material distributed therein. The reinforcement material may take several forms, i.e., fibers, wires, whiskers, flakes or particulates. The tables below are set forth to illustrate physical properties of the matrix metals, the reinforcement materials and the composites.

TABLE 1

| | Material | Constituents | | Melting Point |
|---|---|---|---|---|
| MATRIX METALS | Al (6061) | 97.9% Al<br>.6 Si<br>.28 Cu<br>1.0 Mg<br>.2 Cr | | 582° C.–652° C.<br>1080° F.–1205° F. |
| | Al (7075) | 90.0% Al<br>1.6 Cu<br>2.5 Mg<br>.23 Cr<br>5.6 Zn | | 477° C.–635° C.<br>890° F.–1175° F. |
| | Mg (AZ61A) | 93% Mg<br>6 Al<br>1 Zn | | 525° C.–620° C.<br>975° F.–1145° F. |
| REINFORCEMENT MATERIAL | SiC<br>B₄C | —<br>— | | 2600° C.<br>2450° C. |
| MMC | SiC/Al | Particulate SiC<br>6061 or 7075 Al | 10–40%<br>60–90% | Melting point of lowest melting material |
| | SiC/Al | Fiber SiC<br>6061 or 7075 Al | 10–40%<br>60–90% | Melting point of lowest melting material |
| | B₄C/Mg | Particulate B₄C<br>AZ61A Mg | 10–40%<br>60–90% | Melting point of lowest melting material |
| | B₄C/Al | Particulate B₄C<br>6061 Al | 10–40%<br>60–90% | Melting point of lowest melting material |

In order to successfully fusion weld metal matrix composites, either to other pieces of the composite or to another piece of metal, it is necessary to heat the metals to be joined to a temperature which is above the melting point of the metal constitutents and below that of the reinforcement material. As the pieces to be welded are heated to the desired temperatures, molten pools of the metal materials form. The fluid pools contain reinforcement materials which are in solid form. As the molten pools on the two pieces are brought together, and the pieces allowed to cool, a fusion weld is formed which has substantially the same volume percentage, morphology and distribution of reinforcement material distributed therein as does the base metal.

Figure 1:
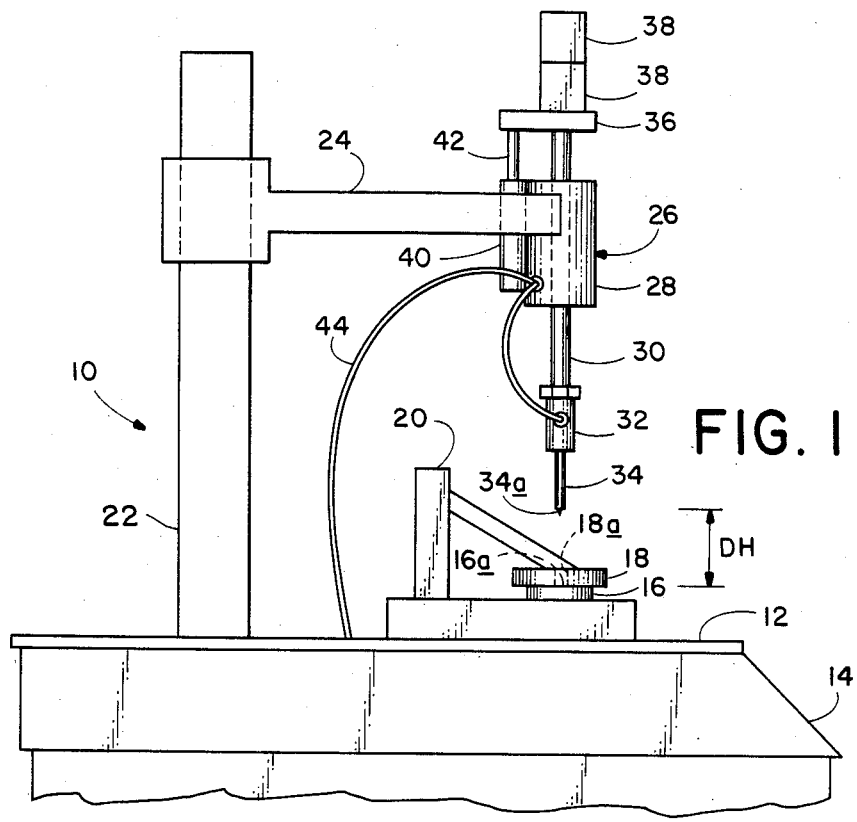
FIG. 1 is a somewhat schematic representation of a capacitor discharge welding apparatus.

One method of selectively heating a metal matrix composite is through a technique known as capacitor discharge welding. Turning now to FIG. 1, a capacitor discharge welding apparatus is shown in somewhat schematic form, generally at 10. Apparatus 10 includes a base 12, having a platform 14 mounted thereon. Platform 14 is operable to support a work piece 16 which is held in place by a work piece cover 18 which in turn is positioned by a clamp 20. Cover 18 has an opening 18a formed therein and is used as required to hold small specimens. Large specimens may be clamped directly to platform 14.

A support column 22 is mounted to base 12 and carries an adjustable support arm 24. A gravity drop head, shown generally at 26 is carried on the free end of arm 24. Head 26 includes a sleeve 28 having a bore extending through the center thereof, and a shaft 30 which extends through the bore in sleeve 28. The lower end of shaft 30 has a chuck 32 mounted thereon. Chuck 32 is operable to hold a stud 34 prior to welding stud 34 to work piece 16. Stud 34 in the preferred embodiment includes an ignition tip or protrusion 34a on one end thereof. A weight platform 36 is fixed to the other end of shaft 30. Platform 36 is provided to enable the placement of weights 38 at an end of shaft 30, thereby to control the force of the impact between stud 34 and work piece 16. For purposes of description, the surface of the stud which is to be welded is identified as a terminal surface 34b, and the surface of the work piece to be welded is identified as a facing surface 16a.

An air cylinder 40 is mounted on sleeve 28 and is operable, through arm 42, to raise platform 36 and shaft 30. An air supply (not shown) is connected to cylinder 40.

A lead cable 44 is connected to sleeve 28 and chuck 32 and also to a convention capacitor bank (not shown) which is located in apparatus 10. A control panel 45 contains controls for adjusting voltage and for controlling the movement of shaft 30 with air cylinder 40. Capacitance levels are internally adjustable.

To briefly describe the operation of apparatus 10, work piece 16 is placed on platform 14 and covered with work piece cover 18. Opening 18a allows stud 34 to pass through cover 18 and contact work piece 16. Work piece 16 and cover 18 are secured in place with clamp 20, which also serves as a grounding connector, grounding work piece 16 to one side of the capacitor circuit contained in apparatus 10.

Stud 34 is then secured in chuck 32 and shaft 30 is raised to a drop height, indicated by DH, above the upper surface 16a of work piece 16. Appropriate voltage and capacitance settings are selected and the capacitor bank allowed to charge. The air in cylinder 40 is released, allowing shaft 30 to drop under the influence of gravity and weights 38.

Figure 2:
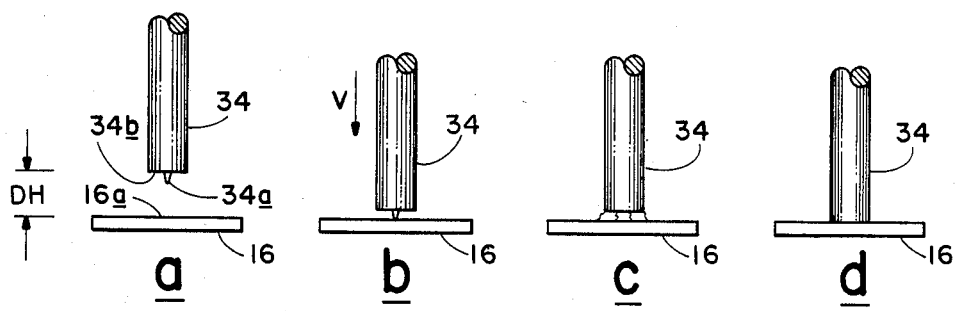
FIG. 2 (a-d) is a schematic representation illustrating capacitor discharge welding technique.

Turning now to FIG. 2, progressive steps in the capacitor discharge welding technique of the invention are illustrated. In FIG. 2a, stud 34 is positioned above work piece 16 by a distance DH (drop height). DH is measured between surfaces 34b and 16a. Appropriate voltage and capacitance levels, to be further explained later herein, are selected in apparatus 10 prior to releasing the air in cylinder 40.

FIG. 2b depicts the condition as tip 34a initially contacts the upper surface of work piece 16 in what is referred to herein as a firing position. Stud 34 has a downward velocity of V at this point. As tip 34a contacts work piece 16, the circuit between the two sides of the capacitor bank is completed, and a high current discharge arc forms between tip 34a and work piece 16, backmelting tip 34a at a rate faster than V.

The arc continues between work piece 16 and stud 34 after tip 34a backmelts. This situation is depicted in FIG. 2c. As stud 34 continues towards work piece 16, the discharge continues, forming molten pools of metal on surface 16a of work piece 16 and surface 34b of stud 34.

Finally, the molten pools make contact, the arcing ceases, some of the molten material is splattered out from between the solid portions of the two pieces, and, as depicted in FIG. 2d, the remaining molten material cools and the weld is completed.

Figure 3:
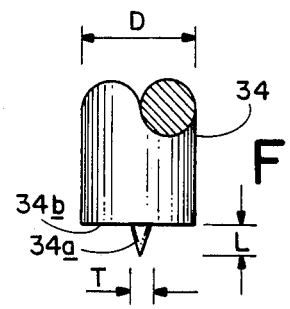
FIG. 3 is a side view of a stud used to practice the invention.

Referring now to FIG. 3, important relationships between the relative sizes of stud 34 and tip 34a are depicted. Stud 34 has a diameter D and tip 34a has a diameter, at its juncture with surface 34b of T. Tip 34a extends downward from surface 34b by a length L.

Generally, in practicing the preferred technique of the method, the cross section of tip 34a, also referred to herein as a discharge inducing element, taken at its juncture with surface 34b is formed to be between 1/20th and 1/150th that of the cross section of surface 34b. The length of tip 34a, L, is between 1/4th and ⅛th the diameter, D, of surface 34b. The formation of tip 34a into a conical section, as depicted in FIG. 3, is thought to provide the best results in practicing the method, although provision of a cylindrical tip, as depicted in FIG. 4, will produce acceptable commercial quality welds.

Figure 4:
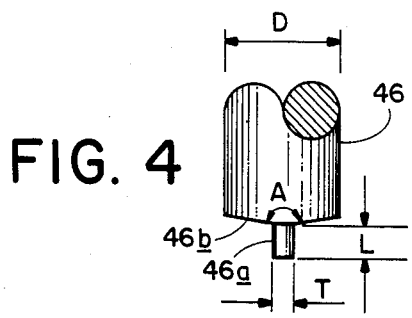
FIG. 4 is a side view of a modified version of the stud of FIG. 3.

Referring now to FIG. 4, a stud 46 is depicted, having a tip 46a with a cylindrical cross section, and a terminal surface 46b. Surface 46b may be a substantially planar surface, or it may have a generally conical form, having an apex angle A of between about 160° and less than 180°. Either form of tip may be used with either form of surface.

The shapes of the ignition tips and the terminal surfaces are selected to provide a point contact between the ignition tip and the facing surface and to focus the discharge towards the center of the terminal surface, after which the arc rapidly spreads across the opposed surfaces to produce uniformly thick molten pools.

Figure 5:
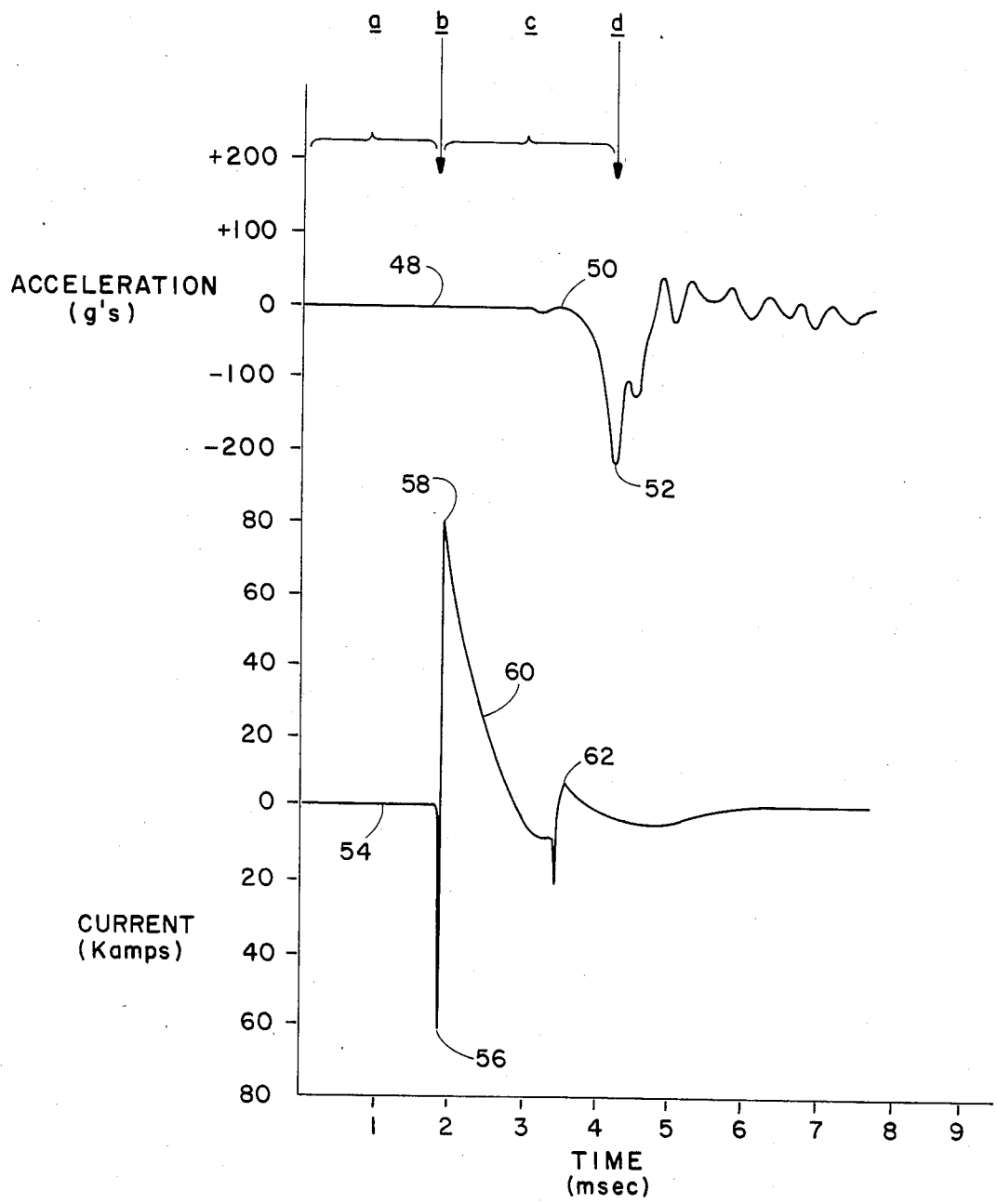
FIG. 5 is a graph representing acceleration of a piece to be welded and current flow through the apparatus of FIG. 1.

Turning now to FIG. 5, a plot of the downward acceleration of stud 34 and the current flowing through stud 34 and work piece 16 is depicted; the letters at the top of the graph representing the corresponding segment of FIG. 2. FIG. 5 is typical of acceleration and current plots of a stud, such as stud 34, which initially starts with the drop height of slightly more than 5 cm, and a drop weight of 6 kg.

The acceleration curve (top portion of the graph) shows that acceleration is substantially constant, at 48, being generated only by gravity, until the molten pools initially make contact with one another, as depicted at 50. The low point on the acceleration curve, 52, is an indication of solid metal contact between stud 34 and work piece 16. The oscillations on the acceleration curve following solid metal contact is an indication of ring down effect which is inherent in any collision situation, as is used in describing the instant method.

The current curve (lower portion of the graph) shows that, initially, no current flows, at 54. The capacitors have been charged at this point but the circuit is not complete. As tip 34a contacts surface 16a, the capacitors begin to discharge, forming an arc between surfaces 16a, 34b, initially with a negative spike 56 and then a positive spike 58. The current level drops, generally at 60 until the liquid pools contact, at 62, fully discharging the capacitor.

The terminal velocity of stud 34 is determined by the drop height, DH. Although a range of drop heights has been used, the optimum height appears to be approximately 5 cm. Such a drop height results in a velocity of approximately 100 cm per second when the ignition tip touches the upper surface of work piece 16 although any velocity greater than or equal to 20 cm per second has been found to be adequate. The length of the ignition tips L, in the test pieces, ranges between 0.635 cm and 0.15 cm. Stud diameter is generally 0.635 cm, although other dimensions may be used. Drop weights may range between 10 kg and 70 kg, depending upon the materials being welded and the size of the weld zone. A weight of 10 to 14 kg is sufficient for a 5 cm drop height and a 0.0635 cm. diameter weld zone. Heavier weights are preferred for larger weld zones.

The drop weight is effective to produce splattering of the material in the molten pool upon contact of solid constituents. Approximately one-half the material in the molten pools is splattered out of the weld zone on such contact. It is believed that the removal of this material, which is the hottest and most fluid material, results in rapid solidification of the remaining matrix material with the reinforcement distributed therein, thereby forming a weld zone having substantially the same proportion of reinforcement material as is distributed in the matrix.

Table 2 is a comparison of drop height and the elapsed time between the time when tip 34a initially touches the work piece and when solid material contact occurs, or, the time between the event depicted in FIG. 2b and that depicted in FIG. 2d.

TABLE 2

| Drop Height (cm) | Time (sec) initial contact to solid contact |
|---|---|
| 0 | .01440 |
| 1.27 | .00200 |
| 2.54 | .00143 |
| 5.08 | .001013 |
| 7.62 | .000829 |

"L" for tip=0.1016 cm

The pieces are essentially at environmental temperature as initial contact is made and are rapidly heated to above the melting point of the matrix material. This heating occurs in the times set forth in table 2. The heating is primarily concentrated in what will become the weld zone, with little of the heat being conducted to the solid material.

The weld zone is rapidly cooled, as approximately half of the molten material is splattered out of the weld zone, and the remaining molten material solidifies quite rapidly, at approximately $10^6$°C./sec. The rapid heating and cooling eliminates the possibility that any trapped gases in the matrix material would be liberated by lengthy heating or that the matrix and the reinforcement material would be heated to temperatures sufficient to promote a chemical reaction between the metal of the matrix and the constituents of the reinforcement material.

Figure 6:
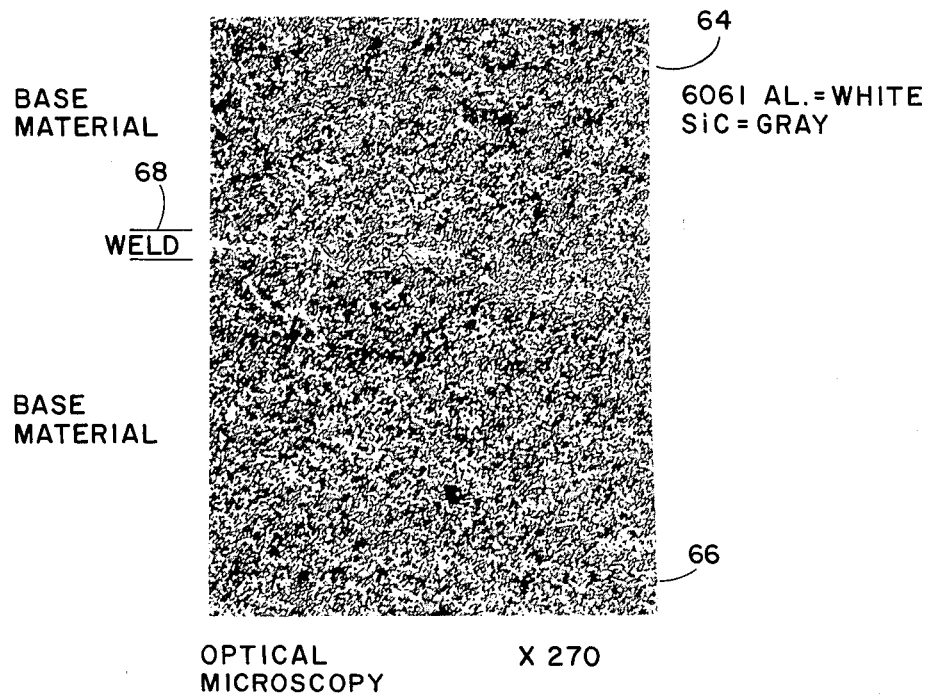
FIG. 6 is photograph taken through an optical microscope showing a weld made according to the invention.
Figure 7:
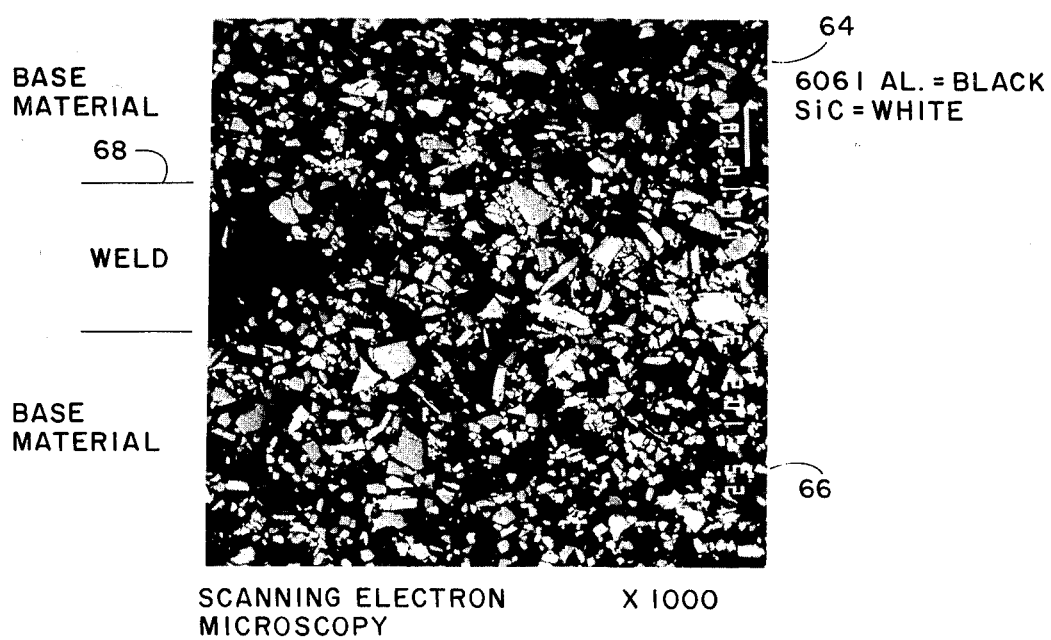
FIG. 7 is a photograph taken through a scanning electron microscope showing the weld of FIG. 6.

Turning now to FIGS. 6 and 7, a weld produced by the method of the invention is shown. Referring first to FIG. 6, a weld zone between a SiC/Al work piece 64 and a SiC/Al stud 66 is depicted at 68. In the photograph, the white material is 6061 aluminum alloy and the SiC appears as gray particles dispersed within the aluminum matrix. SiC is in particulate form and comprises about 40%, by volume, of the MMC. The weld zone in the photograph, magnified 270 times, is barely discernable between the two pieces of base material. The weld zone, as solidified, appears to be approximately 100 microns thick.

Referring now to FIG. 7, the weld zone is shown as magnified 1000 times by a scanning electron microscope. In this photo, the 6061 aluminum matrix appears black and the SiC appears white or gray. It can be seen that the SiC particulate is substantially evenly distributed though the weld zone in substantially the same proportions as it is in the base materials.

Microscopic analysis of the weld zone and before- and after-welding weight comparisons of the pieces indicates that the molten pools formed on the pieces are on the order of less than 200 microns thick. Destructive stress analysis has resulted in structural failure in the base material outside of the weld zone.

As previously noted, $B_4C$ in $B_4C/Mg$ or $B_4C/Al$ has a hardness which is nearly equal to that of diamonds. Machining a tip on such material would require an excessive amount of time, energy and expense. Two pieces of $B_4C/Mg$ are welded by the method of the instant invention by providing a discreet particle of 6061 Al alloy in the shape of the ignition tip and placing the tip on the surface of the work piece to be welded. A conical shaped tip is machined on a 6061 Al stud, removed from the stud, and set on one of the surfaces to be welded.

The presence of 6061 aluminum in the welds between $B_4C/Mg$ materials is of sufficiently small volume that it does not affect the structural integrity of a weld formed between the very hard base materials.

Experimental data has been obtained primarily from fusion welding SiC/Al to other SiC/Al materials, or to 6061 Al material. The SiC has generally been in particulate form (SiCp), although experimentation with SiC in fiber form (SiC$_f$) in an aluminum matrix has also been conducted.

Table 3 sets forth various combinations of work pieces, voltages and capacitance values which have been used to successfully fusion weld MMCs:

TABLE 3

| Pieces 1 | 2 | Drop Height (cm) | Drop Weight (kg) | Volts (dc) | Capacitance mF |
|---|---|---|---|---|---|
| SiC$_p$/Al | SiC/Al | 5.08 | 6 | 90 | 40,000 |
| SiC$_p$/Al | 6061 Al | 5.08 | 6 | 90 | 40,000 |
| SiC$_p$/Al | 6061 Al | 5.08 | 6 | 120 | 40,000 |
| SiC$_f$/Al[1] | 6061 Al | 5.08 | 6 | 100 | 80,000 |
| SiC$_f$/Al[2] | 6061 Al | 5.08 | 6 | 125 | 80,000 |
| $B_4C_p$/Mg[3] | $B_4C$/Mg | 5.08 | 6 | 90 | 40,000 |

[1]Fibers perpendicular to weld zone
[2]Fibers parallel to weld zone
[3]6061 Al ignition tip placed on upper surface of work piece As indicated by the table, successful welds have been made with SiC fibers both running parallel to the weld zone and running perpendicular to the weld zone. In all cases, the reinforcement material comprised approximately 40 volume percent of the composite.

As previously noted, the provision of a conical ignition tip appears to provide the best quality weld. Additionally, the provision of a beveled terminal surface on a stud and a conical ignition tip on the beveled surface provides a weld of superior quality. It is believed that the beveled surface and the conical tip reduce the time required to form the molten pool, affects the splatter characteristics of the molten metal, and increases the solidification rate to approximately $10 \times 10^{6°}$ C./sec, approximately 10 times that of the rate obtained with a planar terminal surface. Additionally, the weld zone using a beveled terminal surface ranges between approximately 30 and 80 microns in thickness. The fast solidification rate and the thinness of the weld zone again eliminates lengthy, high temperature conditions which would contribute to the liberation of trapped gases and the potential chemical reaction between the metal and the reinforcement material.

Welds in SiC/Al have been successfully formed in material having as much as approximately 40%, by volume, SiC in a 6061 Al matrix. The method of the invention may be used with materials having many different percentages of reinforcement materials distributed in the matrix, so long as the composite is capable of conducting an electrical current.

Thus, a method has been disclosed by which extremely hard, heretofore unweldable metal matrix composites may be joined to one another, or to noncomposite metal alloys. The method involves heating the metals to be joined, in a weld region, to a temperature above the melting point of the metal matrix materials and below that of the reinforcement materials. The molten pools formed by the heating are brought together and the pieces allowed to cool, forming a weld between the pieces.

While a preferred method of practicing the invention has been disclosed, it should be appreciated that variations and modifications may be made thereto without departing from the spirit of the invention.

It is claimed and desired to secure by Letters Patent:

1. A method of fusion welding together separate pieces wherein one of the pieces includes a first material having a known melting point and a second material distributed in a known volume percentage in the first material having a melting point substantially higher than that of the first material, and a second piece includes a material having a melting point similar to that of the first material, and below that of the second material, the method comprising:
   with the pieces opposed to each other, heating the pieces to a temperature above that of the melting points of both the first material and the third-mentioned material and below that of the second material;
   producing with such heating a pool of molten material interposed between the pieces from the first and third-mentioned materials;
   bringing the pieces into pressure contact with each other through the pool of material, thereby expelling a portion of the molten material, forming a wed zone; and
   cooling the pieces to a temperature less than the melting point of both the first material and the third-mentioned material, such that the second material is distributed in the weld zone in substantially the same volume percentage as in the one piece.

2. The method of claim 1 wherein said heating includes subjecting the pieces to a high energy electrical discharge.

3. A method of fusion welding together two separate pieces wherein at least one of the pieces is a metal matrix composite including a metal matrix having one melting point and a reinforcement material distributed in the matrix with a substantially higher melting point, the other of the pieces comprising a metal having a melting point similar to the melting point of the metal in said matrix, the method comprising:

bringing the two pieces into opposing relationship;

with a high energy electrical discharge, heating the pieces to a temperature which is above that of the melting point of the metal in the matrix and the metal of the other piece and below that of the melting point of the reinforcement material, producing with such heating a pool of molten material interposed between the two pieces from the metal of the matrix and the metal of the other piece without affecting the integrity of the reinforcement material distributed in the metal matrix;

with the pool established bringing the pieces into pressure contact with each other through the pool of material thereby expelling a portion of the contents of the pool; and cooling the pieces.

4. The method of claim 3 wherein the temperature to which the pieces are heated is lower than the temperature at which a chemical reaction would occur between the metal and the reinforcement material 5. The method of claim 3 wherein the pieces are rapidly cooled.

6. The method of claim 5 wherein said rapid cooling is accomplished at a rate of about $10^{6°}$ C./sec.

7. The method of claim 3 wherein the reinforcement material is distributed in the molten pool in substantially the same proportion as it is distributed in the matrix.

8. A method of fusion welding together two separate pieces wherein one of the pieces is a metal matrix composite including a metal matrix having one melting point and a reinforcement material distributed, in a known volume percentage, in the matrix having a substantially higher melting point and the other piece includes a metal having a melting point similar to that of the metal of the matrix, the method comorising:

providing, on at least one piece, a terminal surface and a protrusion protruding from the terminal surface, the protrusion having a cross section at its junction with the terminal surface of between 1/20 and 1/150 that of the cross section of the terminal surface, and a length of between ¼ and 1/12 of the width of the cross section;

providing a complementing facing surface on the other piece adapted to join with the terminal surface of the one piece;

accelerating the two pieces toward each other to a relative velocity of at least 20 cm/sec, with the surfaces moving relatively towards one another;

after such acceleration forming an electrical arc between the pieces of sufficient intensity to backmelt the protrusion at a rate faster than the relative velocity and to produce a temperature in the pieces which is above the melting points of the metal of the matrix and the metal of the other piece and below the melting point of the reinforcement material;

forming, between the terminal surface and facing surface of the pieces, a weld pool; and bringing the two pieces into pressure contact with each other with the terminal surface bearing on the facing surface, thereby to form a weld zone, wherein the weld zone contains reinforcement material distributed in substantially the same volume percentage as in the metal matrix composite.

9. The method of claim 8 wherein the protrusion is shaped in a substantially cylindrical form.

10. The method of claim 8 wherein the protrusion is shaped in a substantially conical form.

11. The method of claim 8 wherein the terminal surface is a substantially planar surface.

12. The method of claim 8 wherein the terminal surface has a generally conical form, the conical form having an apex angle of between about 160° and less than 180°.

13. The method of claim 8 wherein the weld pool is formed as two portions with one on the terminal surface and one on the facing surface and each has a thickness of less than 200 microns.

14. A method of capacitor discharge welding two metallic pieces together wherein at least one of the pieces comprises a metal having a reinforcement material distributed therein, in a known volume percentage, and such reinforcement material has a higher melting point than the metal of the pieces, the method comprising:

providing a facing surface on one piece;

connecting the one piece to one electrode of a capacitor discharge welding apparatus, the apparatus having capacitors operatively associated therewith;

providing a terminal surface on the other piece;

connecting the other piece to the other electrode of the capacitor discharge welding apparatus;

separating the two pieces a predetermined distance with the facing surface opposite the terminal surface;

selecting voltage and capacitance levels sufficient to produce, when the pieces have moved toward each other and into a firing position, melting of the metal in the pieces without melting the reinforcement material, without causing a reaction between the reinforcement material and the metal and without heating the reinforcement material to a temperature which would liberate gas therefrom;

charging the capacitors in the apparatus to the desired level;

accelerating the two pieces toward each other with the terminal surface moving toward the facing surface;

discharging the capacitors through an arc between the pieces when the pieces are in the firing position;

forming a weld pool on the surfaces through said discharging; and bringing the pieces into contact to form a weld zone, thereby joining the two pieces together, the distribution of reinforcement material in the weld zone having substantially the same volume percentage as in the one piece.

15. The method of claim 14 wherein the selected voltage is between about 40 vdc. and 200 vdc. and the capacitance level is between about 30 K micro Farads and 120 K micro Farads.

16. The method of claim 14 which further includes forming the one piece as a stud having a terminal surface at an end thereof.

17. The method of claim 16 wherein said terminal surface is planar and normal to the longitudinal axis of the stud.

18. The method of claim 16 which further comprises providing a discharge-inducing element on one of the surfaces, the element having a cross section of between 1/20 and 1/150 that of the cross section of the stud and a length of between ¼ and 1/12 the width of the stud.

19. The method of claim 18 wherein the discharge-inducing element has a substantially cylindrical shape.

20. The method of claim 18 wherein the discharge-inducing element has a substantially conical shape.

21. The method of claim 18 discharge-inducing element is a discrete particle.

22. A method of fusion welding together separate pieces wherein one of the pieces is a metal matrix composite including an electrically conductive metal matrix having a first melting point and a reinforcement material distributed in the matrix having a substantially higher second melting point, and the other piece includes an electrically conductive metal having a third melting point substantially less than that of the reinforcement material, the method comprising:

positioning the two pieces into an opposing relationship;

heating the opposed pieces to a temperature above the first and third melting points and below the second melting point;

producing, by such heating opposed pools of electrically conductive metal on each piece, the pool on the one piece having reinforcement material distributed therein;

bringing the pieces into pressure contact with each other through the molten pools thereby expelling a portion of the contents of the molten pool; and cooling the pieces.

23. The method of claim 22 wherein the temperature to which the pieces are heated is lower than a temperature at which a chemical reaction would occur between the metal and the reinforcement material.

24. The method of claim 22 wherein the pieces are rapidly cooled at a rate of about $10^6$ °C./sec.

* * * * *